Patented Feb. 17, 1948

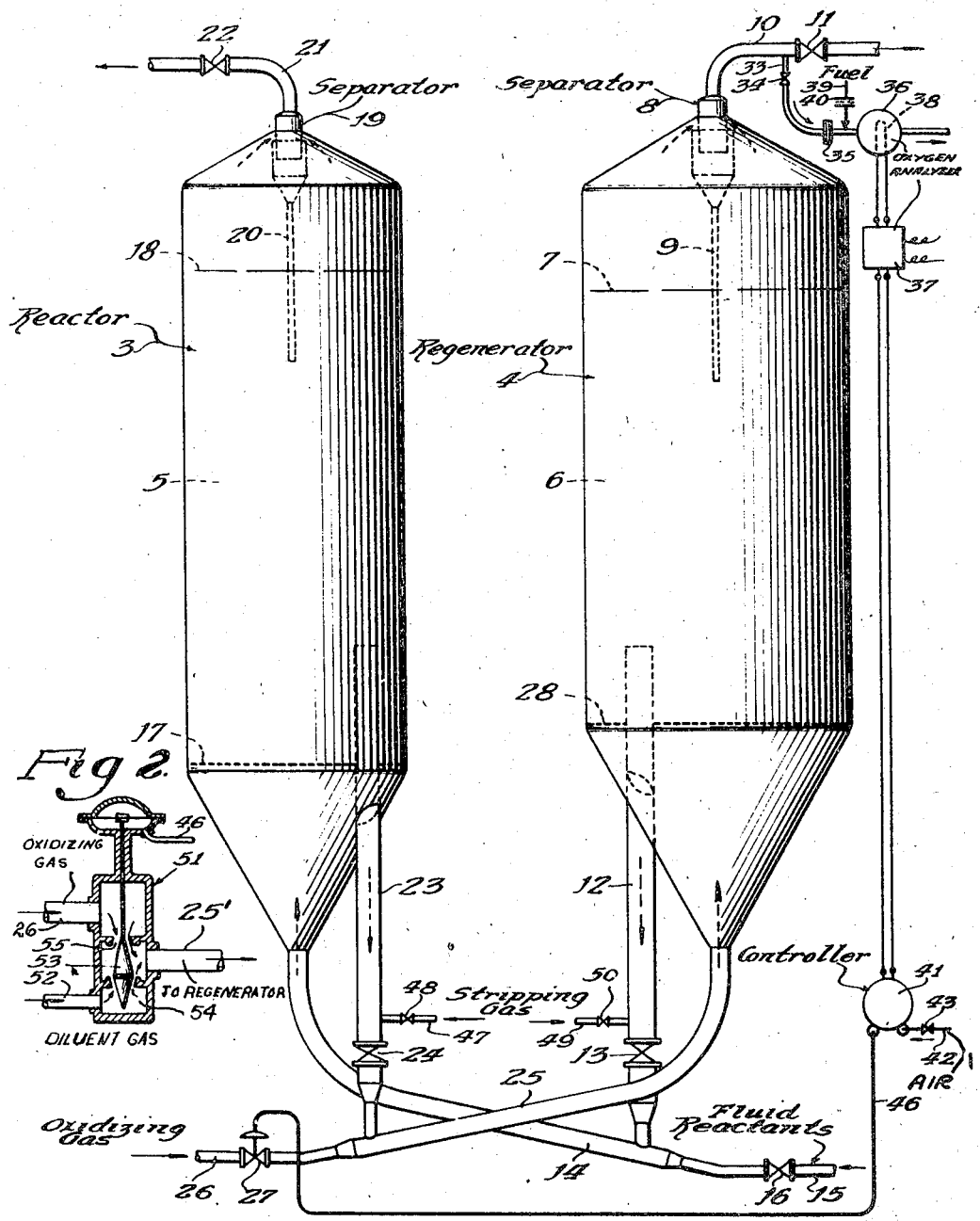

2,436,041

UNITED STATES PATENT OFFICE 2,436,041

CATALYTIC CONVERSION OF HYDROCARBONS

Clarence G. Gerhold and John E. Burgess, Chicago, Ill., assignors to Universal Oil Products Company, Chicago, Ill., a corporation of Delaware Application November 29, 1943, Serial No. 512,084

11 Claims. (Cl. 196—52)

The invention relates to an improved process for the catalytic conversion of fluid hydrocarbons accompanied by regeneration of the catalyst and to an apparatus in which the improved mode of operation may be conducted. The invention is particularly concerned with improvements in the regenerating step of the process which prevent subjection of the catalyst to the excessively high temperatures which cause rapid deterioration of its activity in service.

The features of the invention will be found advantageous as applied to all reactions conducted in the presence of subdivided solid contact material or catalyst which requires regeneration by the burning of combustible contaminants therefrom and which is susceptible to damage at excessively high temperatures. Reactions such as the catalytic cracking of hydrocarbon employing a siliceous catalyst, such as, for example, solid particles comprising a composite of silica with one or more metal oxides, such as alumina and zirconia, exemplify operations to which the features of the invention are particularly applicable. The following description of the invention will, therefore, be directed particularly to its features as applied to catalytic cracking.

The term "cracking" is here used in a broad sense to include operations now generally termed "reforming" or "retreatment" wherein light hydrocarbon distillates, such as gasoline or gasoline fractions, naphtha and the like, are treated in the presence of cracking catalyst to improve their octane rating, susceptibility to lead tetraethyl and the like, as well as operations in which oils boiling above the range of gasoline are converted to produce substantial yields of the latter or in which normally liquid or normally gaseous hydrocarbons are cracked to produce more valuable lighter fractions.

The invention is more specifically directed to an operation of the type which has recently come into prominence and wide commercial use, wherein the subdivided solid catalyst employed is circulated continuously through separate confined reaction and regenerating zones and in each of which a relatively dense mass or bed of the catalyst particles is maintained. The bed in either or both zones and particularly in the regenerating zone is maintained in a fluid-like condition by passing air or other oxidizing gas employed for burning combustible contaminants from the catalyst upwardly through the bed at a sufficient velocity to partially counteract the force of gravity on the catalyst particles and bring about their hindered settling. This turbulent fluid-like condition of the catalyst bed in the regenerating zone is advantageous in several important respects. It facilitates circulation of the catalyst through the system and effects a substantially uniform distribution of heat throughout the catalyst bed undergoing regeneration, thus obviating the development of localized zones of excessively high temperature within the bed. It also facilitates control of the average temperature attained within the bed without the use of extensive and well distributed heat exchange surfaces, such as a multiplicity of tubular elements through which cooling fluid is circulated in indirect contact with the catalyst of the bed to abstract excess heat therefrom.

With the use of a relatively dense fluidized catalyst bed in the regenerating zone, the separation of a major portion of the catalyst particles from the outgoing stream of hot gaseous products of regeneration is effected by keeping the upper extremity of the bed well below the point in the upper portion of the regenerating vessel from which the outgoing regenerating gas is removed. This gives a light phase region above the fluid bed which has a materially reduced solid particle concentration as compared with that prevailing within the bed. A phenomenon known as "afterburning" sometimes occurs in this light phase region where the concentration of solid particles is not sufficiently high to bring about the rapid dispersion of heat. In studying this phenomenon in regenerating equipment provided with observation ports, we have found that a flash will occur at some point in the light phase and travel rapidly downward to the approximate upper level of the relatively dense fluid bed. It is accompanied by a pronounced glowing of catalyst particles in the vicinity of the flash, indicating that they have attained a temperature at which their catalytic activity is destroyed or materially impaired. We attribute this phenomenon to the presence of a flammable mixture of free oxygen and combustibles, such as volatile hydrocarbons evolved from the catalyst bed and/or carbon monoxide, in the gas mixture in the light phase. Ignition of the flammable mixture is probably brought about by its contact with a hot surface in the upper portion of the regenerating vessel and once after-burning is started it is difficult to extinguish or control. In some instances it has carried over into the cyclone separating equipment communicating with the light phase and resulted in damage to the latter, which is not conveniently built to withstand high temperatures. However, greater significance is attached to the damage caused by after-burning to the catalyst.

Cracking catalyst of the type above mentioned, even when substantially free of low melting components, such as alkali metal compounds, rapidly deteriorates in activity when subjected to temperatures above approximately 1300° F., or thereabouts. This is true of other catalysts commonly employed for promoting the conversion of hydrocarbons and other fluid reactants and, in some instances, extensive damage to its activity is encountered at considerably lower temperatures. Therefore, when after-burning occurs, there is a rapid decline in the activity of the catalyst. Even though the concentration of catalyst particles in the light phase is relatively low, a major portion of the entire catalyst inventory within the system will have been present in the light phase at some time during a relatively short period of operation. Since the process is operated continuously over a prolonged period with only a small amount of catalyst replenishment to compensate for the loss of catalyst fines and keep the catalyst inventory substantially constant, even infrequent after burning will cause a pronounced decline in the average activity of the entire catalyst inventory.

The primary purpose of the present invention is to prevent occurrence of the aforementioned phenomenon of after-burning and resulting rapid decline in catalyst activity and possible damage to plant equipment. We have found that this can be accomplished by keeping the concentration of free oxygen sufficiently low to prevent the accumulation of a flammable gas mixture in the light phase and we propose to do this by so limiting the oxygen supplied to the regenerating step that it is substantially entirely consumed during passage of the regenerating gas through the relatively dense fluid-like catalyst bed. In most instances this can be done while employing undiluted air as the oxidizing gas stream supplied to the regenerator without reducing the gas velocity in the regenerating step to such a degree that the catalyst bed is not properly fluidized. It is, of course, possible to have a catalyst bed of such large horizontal cross-section in relation to its depth that the desired fluidization of the bed calls for an excessively large ratio of regenerating gas to catalyst volume and does not permit sufficient reduction in the rate at which regenerating gas is supplied to the bed to prevent after-burning when air alone is employed as the incoming regenerating gas stream. This difficulty can be avoided by proper design of the regenerating vessel and, in any rare instance where it might be encountered in an existing installation, after-burning can be prevented by keeping the air rate sufficiently low and diluting the incoming air with suitable non-oxidizing gas, such as $CO_2$, recycled combustion gases or the like in a sufficient amount to maintain the catalyst bed in the desired fluid-like condition.

The most convenient and preferred method of controlling the rate at which regenerating gas of any predetermined oxygen concentration is supplied to the regenerating zone so as to prevent after-burning is to determine the flammability or non-flammability of the gas mixture leaving the light phase continuously or at frequent intervals during the operation of the process and adjust the regenerating gas rate accordingly. In order to preclude after-burning and correct the operating conditions to prevent its occurrence, rather than stop it after it is initiated, we propose to mix a controlled relatively small amount of combustible material, such as, for example, alcohol, hydrogen, hydrocarbons or the like with a sample of the outgoing regenerating gas stream and pass it through a confined zone in which it is caused to burn when there is sufficient oxygen present in the mixture to support combustion. The percentage of oxygen present in the mixture to which the extraneous fuel has been added is proportional to the temperature rise in the mixture caused by its combustion so that by measuring this increase in temperature, the percentage of oxygen in the mixture can be determined.

We have found that, under the conditions commonly employed in catalytic cracking operations of the fluid bed type, after-burning will not occur in the light phase of the regenerator when the oxygen concentration in the gas mixture is one and one-half to two percent or less by weight. By increasing the temperature in the confined zone to which the sample stream from the light phase is supplied and/or by employing a combustion promoting catalyst and insuring the presence of combustibles by adding fuel to the sample stream, the latter will burn when the oxygen concentration is considerably less than that which would support combustion in the light phase of the regenerator. Therefore, with an oxygen analyzer of this type, measurement of the temperature rise caused by combustion in the confined zone to which the sample stream is supplied, will positively indicate when the oxygen concentration in the light phase is approaching the danger point and permit reduction of the volume or oxygen content of the regenerating gas stream being supplied to the regenerator so as to preclude after-burning.

Oxygen analyzers of the anticipating type above mentioned are available on the market and do not constitute a novel part of the invention per se. However, one specific form of instrument which we have found suitable employs a coil of platinum wire or the like which acts as a combustion promoting catalyst and through which an electric current is passed. The resistance of this platinum coil increases with increasing temperature caused by burning of the sample stream passed in contact therewith so that measurement of the resistance offered by it to the passage of electrical energy therethrough indicates the oxygen concentration in the sample stream.

In the preferred embodiment of the invention changes in resistance through the platinum coil or filament are translated into an impulse which is transmitted to a suitable control instrument of conventional form which functions in response to a predetermined change in the oxygen concentration of the sample stream to open and close a valve in the line admitting the regenerating gas stream to the regenerator. Thus, the occurrence of after-burning in the light phase is automatically prevented.

The invention is explained in more detail in conjunction with the following description of the accompanying diagrammatic drawing.

Figure 1 of the drawing is an elevational view of one specific form of apparatus in which the improved mode of operation provided by the invention may be successfully conducted.

Figure 2 of the drawing indicates, in conjunction with its description, one specific method of controlling the free oxygen content of the regenerating gas stream being supplied to the regenerator while maintaining its volume substantially constant, whereby after-burning in the light phase of the regenerator can be prevented while insuring a sufficient supply of regenerating gas to properly fluidize the catalyst bed in the regenerator.

Referring now to the drawing, a vertically elongated reaction vessel of substantially cylindrical form is indicated at 3 and is operated in conjunction with a similar regenerating vessel 4. The reactor 3 is employed as a zone in which hydrocarbons or other fluid reactants to be converted are contacted with a bed of subdivided solid particles, such as catalyst or contact material, in the presence of which the reactants are converted and upon which deleterious combustible deposits are formed as a result of the conversion reaction. The regenerator 4 is employed as a zone to which contaminated catalyst or contact material is supplied from the reactor and therein contacted with oxidizing gas to burn combustible deposits from the solid particles and thus effect their regeneration.

A relatively dense bed 5 of the subdivided solid particles is maintained in reactor 3 and another relatively dense bed 6 of the solid particles undergoing regeneration is maintained within regenerator 4. In the type of operation to which the invention is particularly directed, the bed of solid particles in the regenerating zone is maintained in a fluid-like condition, while still retaining a relatively high solid particle concentration in the bed, by passing the oxidizing gas employed for regeneration and resulting combustion gases upwardly through the bed at a velocity regulated to partially counteract the force of gravity on the solid particles and bring about their hindered settling within the bed. Preferably, the bed in the regenerator is sufficiently agitated and turbulent to obtain a substantially uniform temperature throughout the bed so as to avoid the development of hot spots or zones of localized excessively high temperature within the bed.

The approximate upper extremity of the relatively dense fluid-like bed in regenerator 4 is indicated by the broken line 7 in the drawing and a region known as the "light phase," in which the solid particle concentration is materially reduced relative to that prevailing in the fluid bed 6, is maintained in the upper portion of the regenerator between the upper extremity 7 of the bed and the point at which the gaseous products of regeneration and solid particles of the catalyst or contact material entrained in the outgoing gas stream are supplied to the separating equipment indicated at 8. Separator 8 may be, for example, of the centrifugal or cyclone type and is provided for the purpose of removing at least a substantial portion of the entrained solid particles from the outgoing gas stream. The separated solid particles are returned from the lower portion of separator 8 through standpipe 9 to the fluid bed 6 and gases from which the solid particles have been separated are directed from the upper portion of separator 8 through line 10 and the pressure control valve 11, preferably to heat recovery equipment of any suitable form, not illustrated.

A relatively dense stream or column of solid particles is directed from a suitable point within the fluid bed 6 of the regenerator downwardly through standpipe 12 and through the adjustable orifice or flow control valve 13 adjacent the lower end of standpipe 12 into transfer line 14, wherein the stream of hot regenerated solid particles meets and commingles with the incoming stream of fluid reactants supplied through line 15 and valve 16. A suitable differential pressure is maintained across the orifice or valve 13 to prevent the upward passage of fluid reactants from line 15 through standpipe 12 and the gas-lift action of the fluid reactants effects transportation of the solid particles from column 12 through line 14 into the lower portion of reactor 3. In case the reactants are supplied to line 14 in liquid state, they will be substantially vaporized by contact therein with the hot regenerated solid particles supplied from the regenerator through column 12 and the resulting mixture of essentially vaporous reactants and suspended solid particles is directed upwardly through the substantially conical lower head of the reactor and substantially uniformly distributed over the horizontal cross-section of its cylindrical portion in passing through a suitable perforate plate or distributing grid 17 provided, in the case illustrated, at substantially the junction of the cylindrical shell with the cone bottom of the reactor.

In the specific operation here illustrated, the bed 5 of subdivided solid particles within reactor 3 is also maintained in a fluid-like condition by the passage of fluid reactants and fluid conversion products upwardly through the bed at a velocity which partially counteracts the force of gravity on the solid particles and brings about their hindered settling. Also, in the case illustrated, a light phase region of materially reduced solid particle concentration is maintained in the upper portion of the reactor above the upper extremity 18 of the fluid bed. The mixture of fluid conversion products and suspended solid particles is directed from the light phase in the reactor to suitable solid particle separating equipment, such as the centrifugal or cyclone separator indicated at 19, wherein at least a substantial portion of the entrained solid particles are separated from the outgoing stream of fluid conversion products. The separated solid particles are returned from the lower portion of separator 19 through standpipe 20 to the fluid bed 5. Fluid conversion products are directed from the upper portion of the separator through line 21 and pressure control valve 22, preferably to further separating, fractionating and collecting equipment of any suitable conventional form, not illustrated.

A relatively dense stream or column of solid particles is directed from any suitable point in the bed 5 of the regenerator beneath its upper extremity 18 downwardly through standpipe 23 and the adjustable orifice or flow control valve 24 disposed adjacent the lower end of the standpipe into transfer line 25. In line 25, solid particles from standpipe 23 meet and commingle with a stream of oxidizing gas supplied to line 25 through line 26 and valve 27. A sufficient pressure drop is maintained across valve 24 to prevent the upward passage of oxidizing gas from line 25 through standpipe 23 and the gas-lift action of the oxidizing gas transports the solid particles from standpipe 23 through transfer line 25 into the lower portion of regenerator 4. The mixture of oxidizing gas employed for regeneration and the suspended solid particles passes upwardly through the conical lower head of the regenerator and is distributed substantially uniformly over the horizontal cross-section of the cylindrical portion of the regenerator by means of a suitable perforate plate or distributing grid 28 provided, in the case illustrated, at substantially the junction of the cylindrical shell with the cone bottom of the regenerator.

In passing upwardly through the fluid-like bed 6 in the regenerator, free oxygen in the regenerating gas stream supplied through line 26 is substantially consumed to bring about rapid oxidation or burning of combustibles from the solid particles within the bed and regenerate the same. The heat thus generated is distributed substantially uniformly throughout the fluid bed 6 by virtue of its turbulent fluid-like condition and the relatively high concentration of solid particles within the bed. When the quantity of combustibles accumulated by the solid particles in the reactor and supplied therewith to the regenerator is so high in relation to the average residence time for the solid particles in the regenerator that the rate at which they are burned to obtain the desired degree of regeneration would cause the development of an excessively high temperature in the fluid bed 6 of the regenerator and thus cause damage or permanent impairment to the catalyst or contact material, we contemplate preventing the development of an excessive temperature in the fluid-like bed in the regenerator by recirculating cooled regenerated catalyst therethrough. This is now a common expedient in operations of the fluid bed type and obviates the use of a heat exchange type regenerator containing a large and well distributed area of heat exchange surface in the form of closely spaced tubes or the like. This control of the average temperature in the fluid bed of the regenerator may be accomplished, for example, by withdrawing a stream of catalyst from the upper portion of the fluid bed and returning the same through a suitable side-arm cooler or heat exchanger to the lower portion of the regenerator for recirculation through the bed. To avoid unnecessary complexity this feature is not illustrated in the drawing, since it is not essential in all operations contemplated by the invention and is not a novel part of the invention per se.

To materially reduce or prevent the passage of reactants and light combustible conversion products, such as occluded hydrocarbon vapors or gases, to the regenerator in the stream of solid particles supplied thereto from the reactor, suitable stripping gas, such as steam, for example, is supplied to standpipe 23 on the upstream side of valve 24 through line 47 and valve 48. Similarly, suitable stripping gas, such as steam, for example, may be supplied through line 49 and valve 50 to standpipe 12 on the upstream side of valve 13 to substantially free the column of solid particles passing through the latter of occluded oxidizing gas and combustion gases and prevent their passage from the regenerator to the reactor. The stripping gas also serves to keep the columns of solid particles passing through standpipe 12 and 23 sufficiently aerated to prevent a degree of compaction which would hinder or stop the flow of solid particles in these standpipes.

A representative sample stream of the gas mixture existing in the light phase above the fluid bed in the regenerator is directed from the gas discharge line 10 through line 33, valve 34 and a suitable orifice 35 to the combustion chamber 36 of the oxygen analyzing instrument which also comprises a portion 37 in which the resistance offered by a platinum coil 38 or the like to the passage of an electric current therethrough is measured and translated into an impulse varying in magnitude with the resistance of element 38. A constant relatively small amount of fuel is supplied to the combustion chamber 36 through line 39 and orifice 40 to insure the presence of combustibles in the gas mixture in the combustion chamber. Thus, before the oxygen content of the gas in the light phase reaches a value at which combustion would occur in the latter, the presence of this smaller amount of oxygen is indicated by burning of the mixture in chamber 36 where the combustion reaction is catalyzed. The resulting increase in temperature in chamber 36 increases the resistance in element 38 and causes the transmission of an impulse through member 27 to controller 41. Controller 41 is of the air-operated type, in the case illustrated, and air admitted thereto at constant pressure through line 42 and valve 43 increases the pressure in the air output line 46 from this instrument when the impulse from member 37 exceeds a predetermined value indicating that the oxygen supply to the regenerator should be reduced. Line 46 from controller 41 is connected, in the case illustrated in Figure 1, to control valve 27 which is a direct-acting diaphragm type valve. Thus, as the oxygen concentration approaches the danger point in the light phase of the regenerator, the air pressure in line 46 reduces the opening through valve 27 to admit a smaller amount of oxidizing gas through line 26 and transfer line 27 to the regenerator. The control instruments are so adjusted that the reduced amount of oxygen being supplied to the regenerator will prevent the accumulation of a sufficient amount of free oxygen in the light phase that the gas mixture therein is flammable under the conditions prevailing in the light phase.

Of course, any other specific form of oxygen analyzer capable of indicating the presence of small amounts of oxygen in the sample gas stream withdrawn from the generator may be employed within the scope of the invention. Also, any other conventional form of control instrument may be substituted for the type indicated at 41 and, when desired, an hydraulic or electrically operated valve of any suitable well known form may be substituted for the diaphragm type air-operated valve 27. It is, of course, also within the scope of the invention to withdraw the sample stream supplied to combustion chamber 36 directly from the light phase of the regenerator instead of from the gas discharge line 10 and, when required, suitable filters or the like may be provided for removing entrained solid particles from the sample gas stream before it is supplied to the oxygen analyzer.

Referring now to Figure 2, this portion of the drawing diagrammatically illustrates a proportioning valve which may be employed in place of the valve 27 indicated in Figure 1. The main stream of oxidizing gas, which may be air, for example, is supplied to the proportioning valve 51 of Figure 2 through line 26 which corresponds to line 26 of Figure 1. Another stream of diluent gas, such as $CO_2$, flue gas or the like, which is substantially free of oxygen or of materially lower oxygen content than the stream supplied to line 26, is admitted to valve 51 through line 52. The position of member 53 of the valve determines the relative proportions of oxidizing gas and diluent gas supplied through valve 51 from the respective lines 26 and 52 to transfer line 25' which corresponds to line 25 of Figure 1. However, member 53 and the openings 54 and 55 at the valve seats are so proportioned that the total quantity of regenerating gas supplied through valve 51 to line 25' remains substantially constant regardless of the position of member 53. Thus, an increase in the air pressure supplied from controller 41 through line 46 to the diaphragm or valve 51 will raise member 53 to admit less oxidizing gas and more diluent gas to line 25' while keeping the total flow through line 25' substantially constant.

The use of a proportioning valve, such as indicated, for example, in Figure 2, will therefore permit adjustment of the oxygen supplied to the regenerator without material change in the velocity of the regenerating gas passing through bed 6. Thus, this velocity can be maintained at a sufficiently high value to insure proper fluidization of the bed in the regenerator regardless of the rate at which oxygen is supplied to the regenerator.

In most instances undiluted air may be employed as the total gas in line 25 without reducing its volume to such an extent that bed 6 will not be properly fluidized. In other instances only a relatively small quantity of diluent gas will ordinarily be required. Therefore, another method of controlling the proportions of air and diluent gas in the incoming regenerating gas stream permits the use of recycled outgoing combustion gases from the regenerator as the diluent and obviates the necessity for separately compressing the hot gases thus recycled. For example, a line leading from the gas discharge line 10 may communicate through a control valve, similar to valve 27 but reverse-acting, with the suction side of a compressor or blower supplying air to the transfer line 25 so that the controller 41 will function to admit recycled combustion gases from the regenerator to the air compressor to dilute the air stream when the oxygen concentration in the light phase, as determined by the oxygen analyzer, approaches the danger point. Although the method and means whereby this type of control is effected is not illustrated in the drawing, it is sufficiently simple to be clear to those conversant with the art from the foregoing brief description.

Although automatic control of the rate at which oxygen is supplied to the regenerator, so as to prevent after-burning, as provided by the invention, is highly desirable, it is entirely within the scope of the invention to manually control the rate at which oxidizing gas is supplied to the regenerator or the proportion of air or oxygen in the incoming regenerating gas stream. This manual adjustment may be made in response to a visual indication furnished by the oxygen analyzer of a condition in the light phase which requires such adjustment.

We claim:

1. In a process wherein a relatively dense fluidized bed of subdivided solid contact material, containing combustibles and susceptible to damage at high temperature, is maintained in a confined zone and oxidizing gas is passed in contact with the bed under conditions regulated to burn combustibles therefrom, the improvement which comprises discharging resulting gaseous products of combustion from the bed and from said zone through a region within the latter of materially reduced solid particle concentration relative to that prevailing within the bed, and preventing the rapid burning of combustible components of the outgoing gas mixture within said region by limiting the free oxygen passed in contact with the bed to a quantity which is so nearly entirely consumed by said burning within the bed, that the gas mixture in said region of reduced solid particle concentration is non-flammable under the conditions prevailing therein.

2. In a process wherein a relatively dense bed of subdivided solid contact material, containing combustibles and susceptible to damage at high temperature, is maintained in a confined zone and oxidizing gas is passed in contact with the bed under conditions regulated to burn combustibles therefrom, the improvement which comprises discharging resulting gaseous products of combustion from the bed and from said zone through a region within the latter of materially reduced solid particle concentration relative to that prevailing within the bed, and preventing the rapid burning of combustible components of the outgoing gas mixture within said region by controlling the rate at which free oxygen is supplied to said zone in said oxidizing gas in response and in inverse relation to the free oxygen content of the gas mixture in said region of reduced solid particle concentration, whereby to keep said mixture non-flammable under the conditions prevailing in said region.

3. The method of removing combustible contaminants from substantially non-combustible subdivided solids susceptible to damage at excessively high temperature, which comprises maintaining a bed of solid particles in a confined zone, passing oxidizing gas upwardly into said bed at a velocity regulated to partially counteract the force of gravity on the solid particles and maintain the bed in a relatively dense, fluid-like state, controlling the temperature of the bed to effect the burning of combustibles therefrom by contact with said oxidizing gas and to prevent damage to the solid particles, maintaining a region of materially reduced solid particle concentration above the bed within said confined zone, discharging gaseous products of combustion from said bed and zone through said region, and controlling the rate at which free oxygen is supplied to said bed in the oxidizing gas stream to insure its substantially complete consumption within the bed and to keep the free oxygen content of the outgoing gas mixture sufficiently low that said mixture is non-flammable under the conditions prevailing in said region of reduced solid particle concentration.

4. The method defined in claim 3, wherein said control of the rate at which free oxygen is supplied to the bed is effected in response and in inverse relation to the free oxygen content of the outgoing gas mixture.

5. The method defined in claim 3, wherein said oxidizing gas supplied to said bed comprises a mixture of air and diluent gas, and wherein the velocity of the gases passing through said bed is kept substantially constant by controlling the proportional amounts of air and diluent gas in the oxidizing gas stream while maintaining the total volume of the latter substantially constant.

6. In a process wherein a bed of subdivided solid catalyst, contaminated with combustibles and susceptible to damage at high temperature, is maintained in a confined zone and oxidizing gas is passed upwardly into said bed at a velocity regulated to keep the latter in a relatively dense, fluid-like state and under conditions regulated to burn combustibles from the catalyst particles and to regenerate the same, resulting gaseous products of combustion being discharged from the upper portion of the bed and from said zone, the improvement which comprises maintaining a light phase of materially reduced catalyst particle concentration above the fluid-like bed in the upper portion of said confined zone to obtain within said zone a major separation of catalyst particles from the outgoing combustion gases, and limiting the free oxygen supplied to said zone in the oxidizing gas to an amount which is substantially entirely consumed in passing through the bed, leaving the free oxygen content of the gas mixture in said light phase sufficiently low that the mixture is non-flammable under the conditions prevailing in said light phase.

7. A process for the continuous catalytic conversion of fluid reactants accompanied by continuous regeneration of the catalyst which comprises, maintaining a bed of subdivided solid catalyst capable of promoting said reaction in a confined reaction zone, passing said fluid reactants in contact with the catalysts of said bed and therein effecting the conversion reaction with a resulting deposition of combustible contaminants on the catalyst, continuously transferring contaminated catalyst from the reaction zone to a separate confined regenerating zone, maintaining a bed of the catalyst particles in the regenerating zone, supplying a stream of oxidizing gas to the regenerating zone and into contact with the bed therein to burn combustibles from the latter, maintaining the last named bed in a relatively dense fluid-like state by passing the oxidizing gas and resulting combustion gases upwardly therethrough at a velocity regulated to partially counteract the force of gravity on the catalyst particles in the bed, maintaining a light phase of materially reduced catalyst particle concentration in the upper portion of the regenerating zone above said fluid-like bed, discharging gaseous products of the regeneration from said bed and from the regenerating zone through said light phase, returning a stream of regenerated catalyst particles from a point in said fluid-like bed beneath its upper extremity to said reaction zone and to the catalyst bed therein, and limiting the rate at which free oxygen is supplied to the regenerating zone in said oxidizing gas stream to keep the outgoing gas mixture non-flammable in said light phase.

8. The process of claim 7, wherein said fluid reactants comprise hydrocarbons.

9. The process of claim 7, wherein said reaction comprises the catalytic cracking of fluid hydrocarbons and wherein the solid particles comprise a cracking catalyst.

10. A method for the regeneration of contaminated subdivided solid contact material which comprises passing an oxygen-containing gas upwardly through a mass of said contact material in a confined zone at a rate regulated to form a lower dense turbulent phase and an upper light phase; burning combustible contaminants from said contact material in said dense phase and controlling the temperature of said burning to avoid damaging said contact material; discharging combustion gases from the light phase region of said zone; and preventing the rapid burning of combustible components, such as carbon monoxide, of said combustion gases during the passage of the latter through said light phase by limiting the oxygen contacted with said contact material in said dense phase to an amount which, upon reaction with said contaminants, produces a substantially non-flammable combustion gas mixture.

11. The process of claim 10 further characterized in that the amount of oxygen contacted with said contact material in the dense phase is such that it is substantially completely consumed therein.

CLARENCE G. GERHOLD.
JOHN E. BURGESS.

REFERENCES CITED

The following references are of record in the file of this patent:

UNITED STATES PATENTS

| Number | Name | Date |
|---|---|---|
| 1,666,273 | Smith | Apr. 17, 1928 |
| 2,345,487 | Liedholm | Mar. 28, 1944 |
| 2,073,638 | Houdry | Mar. 16, 1937 |
| 2,326,705 | Thiele et al. | Aug. 10, 1943 |
| 2,353,731 | Kanhofer | July 18, 1944 |
| 2,378,342 | Voorhees et al. | June 12, 1945 |
| 2,374,151 | Wolk et al. | Apr. 17, 1945 |
| 2,358,039 | Thomas et al. | Sept. 12, 1944 |
| 2,414,883 | Martin | Jan. 28, 1947 |
| 2,382,382 | Carlsmith et al. | Aug. 14, 1945 |